Patented Feb. 6, 1940

2,189,144

UNITED STATES PATENT OFFICE 2,189,144

CHOCOLATE AND METHOD OF MAKING SAME

John L. Klewer, Chicago, Ill.

No Drawing. Application October 19, 1938, Serial No. 235,784

5 Claims. (Cl. 99—23)

This invention relates to an improved chocolate product and more particularly to a readily dispersible aqueous chocolate magma and to methods of preparing the same, and to alimentary products utilizing the improved chocolate magma as an ingredient thereof.

Chocolate has as one of its important components chocolate butter fat or cocoa butter. This natural fat is present in the chocolate in proportions ranging from about 35% to 55% by weight and higher. This fatty component makes it difficult for chocolate to be utilized as an ingredient in alimentary products because of the tendency of the fat to agglomerate and separate.

This tendency to agglomerate and separate is especially characteristic of chocolate having a high fat content in the order of about 40% to 55% by weight and higher and, in particular, of a chocolate having a fat content in the order of about 48% to 53% and which is known in the trade as "chocolate liquor". In such high fat content chocolate there is a decided tendency for the butter fat to agglomerate in relatively large globules and prevent any alimentary product containing chocolate from attaining a homogeneous condition. This is true in all heretofore known methods of processing chocolate or of incorporating the processed or unprocessed chocolate into alimentary products. When a high fat content chocolate is heated to melt the chocolate for use as such or for incorporation in any edible product, the cocoa butter coalesces and separates into a distinct layer. This tendency for agglomeration and segregation of the chocolate fat content, particularly of the high fat content chocolates has many obvious objections. Thus it has militated against the ready use of such chocolates, particularly for domestic use, because of the difficulty of preparing uniform and homogeneous products containing the same. In accordance with my invention, the hitherto known objections to the use of butter fat containing chocolates are overcome and a readily dispersible magma of such high fat chocolates is produced which may be readily and quickly incorporated in food products without difficulty, and without prolonged beating or mixing.

In processing chocolate in accordance with my invention I first form a dispersible mixture or magma of chocolate and a minor proportion of water. The magma is preferably formed by preliminarily subjecting the chocolate to a suitably high temperature to place it in a molten state, say in the order of about 160° F. to about 205° F. preferably at 180° to 205° F. or slightly higher but below 212° F., and the molten chocolate is mixed with the water, preferably heated to within about the same range as the temperature of the chocolate. The mixing may be carried out in any suitable vessel such as a steam jacketed kettle provided with suitable agitating means, and in the preferred form of my invention I first agitate the molten chocolate in the kettle to effect a uniform dispersion of the butter fat throughout the chocolate and subsequently mix the heated water with the chocolate while continuing the agitation. I find that this procedure may be reversed and the molten chocolate added to the water in the mixing kettle.

The proportions of molten chocolate to water may vary somewhat. The water is present in a minor proportion; that is, in a proportion by weight less than that of the chocolate. I have found that the best results are obtained when about 3 parts by weight of chocolate are mixed with about 1 to 2 parts by weight of water. The proportion of water may be reduced to as low as about one-half part by weight providing the water is introduced into the chocolate in the form of steam. The water, thus incorporated, appears to promote the dispersion of fat. A proportion somewhat greater than 2 parts by weight of water may be used if desired, but is not advisable. Furthermore, a substantial increase in water above the limits set forth renders the chocolate susceptible to fermentation and to this extent impairs the keeping qualities of the chocolate.

In the following example illustrative of my invention, I specify a chocolate having at least a 48% by weight butter fat content. It is obvious, however, that my invention is also applicable to lower fat content chocolate although as stated above it is particularly applicable to chocolates having a fat content of the order of about 45% to 55% by weight and higher.

Three parts by weight of chocolate having a fat content in the order of about 48% by weight is heated to between about 195° F. to about 205° F. in a kettle provided with a mixer, to melt the chocolate. The molten chocolate is thoroughly mixed or agitated to effect uniform dispersion of the fat content and while being agitated, 1 part by weight of water, heated to about the same temperature range as the chocolate, is stirred in. The stirring is continued until the mixture or magma attains a plastic state and a homogeneous, smooth, fine-grained texture, and in this condition has little or no tendency to stick to the kettle walls. This usually requires in the order of about 5 to 15 minutes.

Variation of the water content within the limits previously noted cause little change in the physical characteristics of the processed chocolate magma except to alter the consistency of the paste-like mass.

The magma or paste thus produced is characterized by its ready dispersibility in sugar syrups, aqueous mixtures and the like without agglomeration or coalescence of the fat or cocoa butter particles. The magma is a dispersion or paste-like emulsion in which the fat particles are dispersed in very finely divided form, the water apparently forming, with non-fat constituents of the chocolate, the continuous phase in which the fat particles are dispersed. The fact that the processed chocolate magma does not stick to the container wall and that it is readily added to water, aqueous sugar syrups and the like, lend support to this view.

Thereafter the chocolate magma as thus prepared may be incorporated immediately in alimentary products or it may be cooled and stored for future use. The chocolate magma produced as above described is stable with respect to physical and chemical change, does not ferment and does not dry out or materially change in its moisture content. Hence, it may be stored in any suitable manner, although vacuum packing is preferred.

The chocolate magma prepared in accordance with my invention, either hot or cold, is particularly adapted for use alone or in conjunction with other materials for the preparation of edible products. Thus it may be used for making icings, candies or cold or hot drinks, such as chocolate milk shakes or hot toddy. The readiness with which the improved chocolate magma mixes with other ingredients to form alimentary products permits of its ready and simple use and makes possible the use of chocolates having high fat content under what might normally be considered as adverse if not impossible conditions. The improved chocolate magma has its fat content thoroughly and uniformly dispersed and the fat exhibits no tendency to agglomerate or segregate even when the fat content is of the order of 55% by weight and higher of the original untreated chocolate.

The products into which the improved chocolate magma is mixed as an ingredient thereof are homogeneous and are generally characterized by a smooth texture. I have also found that both the improved chocolate magma alone and alimentary products containing the chocolate keep unusually well and exhibit practically no tendency toward rancidity.

The chocolate magma prepared in accordance with my invention is particularly applicable for example, for use in the manufacture of a fudge mix. Thus as an example, a fudge mix may be made as follows. It is to be understood, of course, that the precise quantities, proportions and temperatures hereinafter set forth may be varied within wide limits and that numerous changes in the character and number of ingredients may be made.

About 4 parts by weight of sugar are dissolved (with heat) in about 1 part by weight of water to form a syrup. The sugar is preferably cane or beet sugar, although other sugars, such as invert sugar, dextrose, glucose, maltose, levulose, maple sugar or the like or any mixtures thereof may likewise be used. It is preferred, however, in the case of a mixture, to use about two-thirds or more by weight of the sugar in the form of cane or beet sugar and the remainder of invert sugar or dextrose. The sugar syrup is suitably heated, for example, in a steam jacketed kettle or by any other means to a temperature slightly below the caramelization point say, about 238° F. This heating is continued for a short time and the syrup is then cooled to between 110° F. and 120° F. Thereafter the syrup is beaten until it has a dough-like fine-grained texture. The processed chocolate magma described above is then added in suitable small proportions to a relatively large proportion of the grained sugar syrup; for example, in the order of about 1 part by weight of chocolate to about 4 or 5 or even more parts by weight of sugar syrup to form the fudge mixture. The chocolate magma so added may be either hot or cold, although I prefer the former. The fudge mixture is then beaten to distribute the chocolate uniformly throughout the sugar syrup. At this time other ingredients such as nuts or flavoring material may be added, if desired. Honey, if used, should be added at this time since excessive heating thereof is to be avoided. The entire mass is finally cooled down to room temperature, forming a fudge mix.

To make fudge with the above fudge mix, it is only necessary to add about 1 part by weight of water to about 32 parts by weight of fudge mix, heat to a boil and stir to smooth out. Thereafter the hot fudge is cooled in the usual manner.

In preparing a fudge mix to be marketed as such, special flavorings and other ingredients such as nuts and the like is preferably omitted in the preparation of the mix, and may be incorporated in the production of the fudge from the fudge mix as described in the preceding paragraph.

The fudge mix may be used to make icing by mixing about 2 parts by weight of water to about 32 parts by weight of fudge mix. Doubling the water proportion to 4 parts by weight will yield a syrup which may be used on ice cream, in soft drinks or the like. I have also used the syrup in the manufacture of ice cream and have found that the thorough dispersion of fat is unimpaired by the low temperature encountered.

The resulting fudge is characterized by a uniform fine crystal structure and has unusually excellent keeping qualities. Under normal conditions the fudge retains its original moisture content without appreciable change. I have also noted that fudge made as above is more palatable and digestible than has heretofore been the case. By virtue of the use of the improved chocolate magma in the fudge, a uniformly excellent product is secured at all times even with a high fat content chocolate. The high degree of dispersion of the fat removes the element of chance customarily existing with regard to a thorough and smooth intermixture of the chocolate and other ingredients. Thus the manufacture of not only fudge but all alimentary products containing chocolate as an ingredient is reduced to a simple, exact procedure of a mechanical nature and is not dependent upon the vagaries of precise fat content of chocolate and other factors normally affecting the dispersion of the fat in the product.

It will be appreciated that the dispersible chocolate magma and the fudge mix, prepared as above described, may be packaged and marked for either household or manufacturers use, enabling the purchaser to readily and quickly produce fudge, icings, syrup and the like of uniform quality and without failures.

I claim:

1. The method of treating butter-fat containing chocolate to effect a uniform, stable dispersion of the fat throughout the chocolate and form a dispersible aqueous chocolate magma comprising agitating and maintaining a hot mixture of about 3 parts by weight of chocolate having a butter-fat content in excess of about 35% and between 1 and 2 parts by weight water at a temperature between 180° F. and 210° F. until the mixture is a paste-like plastic and attains a homogeneous, smooth, fine-grained texture.

2. The method of treating butter-fat containing chocolate to effect a uniform, stable dispersion of the fat throughout the chocolate and form a dispersible aqueous chocolate magma comprising heating chocolate having a butter-fat content in excess of 35% to a temperature below 212° F. to melt the same, agitating said molten chocolate, mixing water therewith as steam during agitation in proportions of about 3 parts by weight chocolate and between ½ and 2 parts by weight water and agitating and maintaining said mixture at a temperature between 180° F. and 210° F. until it is a paste-like plastic and attains a homogeneous, smooth, fine-grained texture.

3. The method of treating a chocolate containing an original butter-fat content of at least 40% by weight to effect a uniform, stable dispersion of the fat throughout the chocolate comprising heating about 3 parts by weight of such chocolate to between 195° and 205° F. to melt the same, agitating the molten chocolate to disperse the fat, adding thereto about 1 part by weight of water between 195° and 205° F. and agitating and maintaining the mixture at said temperature range until it is a paste-like plastic and attains a homogeneous, smooth, fine-grained texture.

4. As a new article of manufacture, a stable, paste-like, dispersible aqueous chocolate magma having a fat content in a dispersed condition and adapted to be readily mixed with other edible ingredients, said article comprising about 3 parts by weight of chocolate of high fat content in excess of 35% and ½ to 2 parts of water and having a homogeneous, smooth, fine-grained texture.

5. As a new article of manufacture, a stable, paste-like, dispersible aqueous chocolate magma having a fat content in a dispersed condition and adapted to be readily mixed with other edible ingredients, said article comprising about 3 parts by weight of untreated chocolate having an original butter-fat content of between 48 and 53% by weight and between 1 and 2 parts by weight of water and having a smooth, homogeneous, fine-grained texture.

JOHN L. KLEWER.